United States Patent
M et al.

(10) Patent No.: US 10,055,697 B2
(45) Date of Patent: Aug. 21, 2018

(54) SYSTEM AND METHOD FOR ALLOCATING SLOTS TO A PLURALITY OF PRODUCTS IN A WAREHOUSE

(71) Applicant: HCL Technologies Limited, Noida (IN)

(72) Inventors: Madhusudhan R M, Chennai (IN); Ashar Pasha, Frisco, TX (US)

(73) Assignee: HCL TECHNOLOGIES LIMITED, Noida (IN)

( * ) Notice: Subject to any disclaimer, the term of this patent is extended or adjusted under 35 U.S.C. 154(b) by 59 days.

(21) Appl. No.: 15/456,793

(22) Filed: Mar. 13, 2017

(65) Prior Publication Data

US 2018/0096265 A1    Apr. 5, 2018

(30) Foreign Application Priority Data

Oct. 5, 2016   (IN) .............................. 201611034093

(51) Int. Cl.
*G06Q 10/04* (2012.01)
*G06Q 10/06* (2012.01)

(52) U.S. Cl.
CPC ....... *G06Q 10/04* (2013.01); *G06Q 10/06315* (2013.01)

(58) Field of Classification Search
CPC .......................... G06Q 10/04; G06Q 10/06315
USPC ........................................................ 700/214
See application file for complete search history.

(56) References Cited

U.S. PATENT DOCUMENTS

| 8,234,004 B2 | 7/2012 | Grissom | |
|---|---|---|---|
| 2007/0094101 A1* | 4/2007 | Breitling | G06Q 10/08 705/28 |
| 2009/0216364 A1* | 8/2009 | Grissom | G06Q 10/087 700/214 |
| 2013/0226649 A1* | 8/2013 | Grissom | G06Q 10/087 705/7.25 |

OTHER PUBLICATIONS

"How To Optimize Warehouse Efficiency With Warehouse Management Software?", Archer Software (http://www.archersoft.com/en/blog/howoptimizewarehouseefficiencywarehousemanagementsoftware), Mar. 8, 2017 (Retrieved Date), 10 pages.

* cited by examiner

*Primary Examiner* — Kyle O Logan
(74) *Attorney, Agent, or Firm* — Shumaker, Loop & Kendrick, LLP

(57) ABSTRACT

Disclosed is a system for allocating slots to a plurality of products in order to facilitate optimization of space in a warehouse that includes a rating assigning module for assigning a slot priority rating and a product priority rating. The slot priority rating is assigned to each slot whereas the product priority rating is assigned to each product of a plurality of products to be placed in the plurality of slots present in the warehouse. A metadata retrieving module for retrieving metadata from a tag associated to a product of the plurality of products. In one aspect, the metadata indicates the product priority rating being assigned to the product. A slot determination module for determining a slot from the plurality of slots in order to place the product. A slot allocation module for allocating the slot, as determined, for placing the product thereby facilitating the optimization of space in the warehouse.

11 Claims, 4 Drawing Sheets

SYSTEM AND METHOD FOR ALLOCATING SLOTS TO A PLURALITY OF PRODUCTS IN A WAREHOUSE

PRIORITY INFORMATION

This present application claims priority from Indian Patent Application No. 201611034093, filed on Oct. 5, 2016, the entirety of which is hereby incorporated by reference.

TECHNICAL FIELD

The present subject matter described herein generally relates to allocating slots to a plurality of products in order to facilitate optimization of space in a warehouse.

BACKGROUND

In a supply chain network, a warehouse plays a vital role in receiving and supplying the right product, at the right place, at the right time for many years. It is evident that globalization and emergence of Omni-channel e-commerce platforms have significantly increased the role of the warehouse in the supply chain network. As the warehouse has become essential in the supply chain network, it becomes very important to address the challenges hindering optimal performance in managing the supply chain network. One of the major pain points in optimizing the utilization of space of the warehouse is confronting third-party logistics providers (3PLs) reserving location and/or slots in the warehouse for the utilization of space inside each location and thereby placing the products in the reserved slots based on demand of the product in the market. Improper utilization of the space impacts major areas of operations. Some of the areas of operations may include, but not limited to, scope for increasing the business revenue, lack of visibility on partially utilized locations resulting in poor result warehouse occupancy rate, stock turnaround ratio of the warehouse is affected due to improper utilization of the space, lack of space in the warehouse delays vehicle offloading at the receiving operations, offloading delays lead to increase in vehicle halting hours and vehicle turn-around time.

In addition to the above, in most warehouses where there are little or no efficient operational processes, the operators store the products wherever they find the first available home and in such environment there is little reason to predict as which product should go where within the warehouse. There are still many warehouses that merely use simple spread sheet based processes for slotting and it is reasonable to some extent as long as the warehouse is small and running on lower volume. But as the size of the warehouse, volume and the product families' increase, an advanced slotting tool is necessitated in order to gain the maximum out of the existing provisions, especially in the ever growing margin pressures and the competitive nature in retaining the customers in the warehouse.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for allocating slots to a plurality of products in order to facilitate optimization of space in a warehouse and the concepts are further described below in the detailed description.

In one implementation, a system for allocating slots to a plurality of products in order to facilitate optimization of space in a warehouse is disclosed. The system may include a processor and a memory coupled to the processor. The processor may execute a plurality of modules present in the memory. The plurality of modules may include a rating assigning module, a metadata retrieving module, a slot determination module, and a slot allocation module. The rating assigning module may assign a slot priority rating to each slot based on a user's accessibility to a plurality of slots. In one aspect, each of the plurality of slots may include an Internet of Things (IoT) device. The rating assigning module may further assign a product priority rating to each product of a plurality of products to be placed in the plurality of slots present in the warehouse. In one aspect, the product priority rating may be assigned based on demand of Fast Moving Consumer (FMC) products. The metadata retrieving module may retrieve metadata from a tag associated to a product of the plurality of products. In one aspect, the metadata indicates the product priority rating being assigned to the product. In one aspect, the metadata may be retrieved upon scanning the tag by using a scanning device. The slot determination module may determine a slot, from the plurality of slots, in the warehouse for placing the product. In one aspect, the slot may be determined based on a predefined mapping of the product priority rating and the slot priority rating. The slot allocation module may allocate the slot, as determined, for placing the product thereby facilitating the optimization of space in the warehouse.

In another implementation, a method for allocating slots to a plurality of products in order to facilitate optimization of space in a warehouse is disclosed. In order to allocate the slots to the plurality of products, initially, a slot priority rating and a product priority rating may be assigned. In one aspect, the slot priority rating may be assigned to each slot based on a user's accessibility to a plurality of slots. The product priority rating, on the other hand, may be assigned to each of the plurality of slots includes an Internet of Things (IoT) device. In one aspect, the product priority rating may be assigned based on demand of Fast Moving Consumer (FMC) products. Upon assigning the slot priority rating and the slot priority rating, metadata may be retrieved from a tag associated to a product of the plurality of products. In one aspect, the metadata indicates the product priority rating being assigned to the product. In one aspect, the metadata may be retrieved upon scanning the tag by using a scanning device. Subsequent to the retrieval of the metadata, a slot from the plurality of slots may be determined in the warehouse for placing the product. In one aspect, the slot may be determined based on a predefined mapping of the product priority rating and the slot priority rating. After determining the slot, the slot may be allocated for placing the product thereby facilitating the optimization of space in the warehouse. In one aspect, the aforementioned method for allocating slots to the plurality of products may be performed by a processor using programmed instructions stored in a memory.

In yet another implementation, non-transitory computer readable medium embodying a program executable in a computing device for allocating slots to a plurality of products in order to facilitate optimization of space in a warehouse is disclosed. The program may include a program code for assigning a slot priority rating and a product priority rating. The slot priority rating may be assigned to each slot based on a user's accessibility to a plurality of slots, wherein each of the plurality of slots includes an Internet of Things (IoT) device. The product priority rating, on the other hand, may be assigned to each product of a plurality of products to be placed in the plurality of slots present in a warehouse, wherein the product priority rating is assigned based on demand of Fast Moving Consumer (FMC) products. The program may further include a program code for retrieving metadata from a tag associated to a product of the plurality of products, wherein the metadata indicates the product priority rating being assigned to the product, and wherein the metadata is retrieved upon scanning the tag by using a scanning device. The program may further include a program code for determining a slot, from the plurality of slots, in the warehouse for placing the product, wherein the slot is determined based on a predefined mapping of the product priority rating and the slot priority rating. The program may further include a program code for allocating the slot, as determined, for placing the product thereby facilitating the optimization of space in the warehouse.

BRIEF DESCRIPTION OF THE DRAWINGS

The foregoing detailed description of embodiments is better understood when read in conjunction with the appended drawings. For the purpose of illustrating the disclosure, example constructions of the disclosure is shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
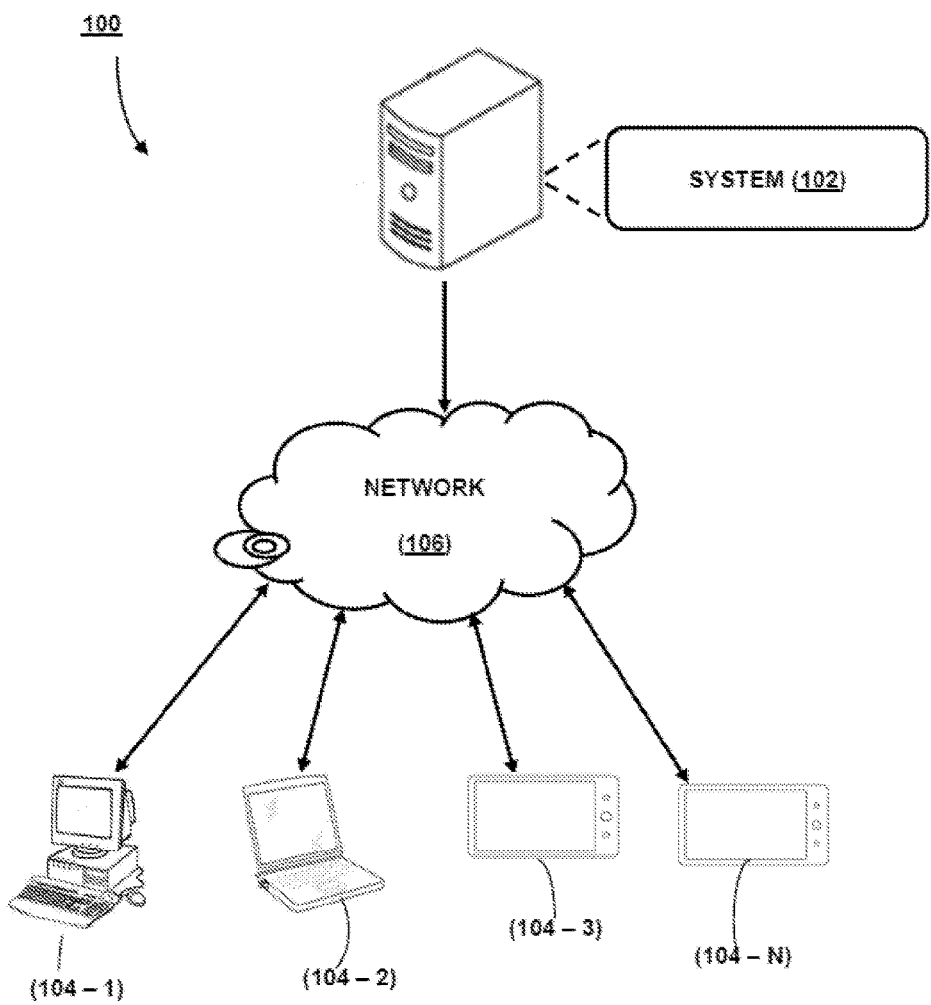
FIG. 1 illustrates a network implementation of a system for allocating slots to a plurality of products in order to facilitate optimization of space in a warehouse, in accordance with an embodiment of the present subject matter.

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

Warehouse Management as a business is getting more complicated. With the ever growing competition and increased pressure on margins, it's becoming necessary to improve the efficiency of facilities, resources and operations in and around warehouses. With the help of Internet of Things (IoT), slotting becomes more robust and effective. Slotting is one such functionality that most of the warehouses need in order to optimize the space in the warehouse. This supplements any Warehouse Management System (WMS) to define the placement of products within the warehouse's facility by computing the optimum slot(s) for the product(s) in the warehouse and maximize the use of the warehouse's slot's space thereby enhancing the storage space, labour and picking efficiency, balanced workload resulting in reduction in warehouse handling costs.

With the help of Internet of Things (IoT) based sensors and Radio-Frequency Identifications (RFIDs), the slotting may be done more effectively in the WMS. These processes may be automated so that manual handling can be avoided. A modern automated process with IoT slotting mechanism identifies the most efficient storage type, picks location and assigns to each item in the warehouse. In one aspect, the slotting may be done based on a set of rules or strategies that may depend on a large set of factors including, but not limited to, product family, weight, size, dimensions, nature of the product. In order to create the slot, the system may receive such factors as inputs to recommend an appropriate slot for product in the warehouse.

In order to allocate the slots to a plurality of products, initially, a slot priority rating and a product priority rating may be assigned. The slot priority rating may be assigned to each slot based on a user's accessibility to a plurality of slots. The product priority rating, on the other hand, may be assigned to each product of a plurality of products to be placed in the plurality of slots present in the warehouse. Subsequent to the assigning of the slot priority rating and the product priority rating, metadata may be retrieved from a tag associated to a product of the plurality of products. The metadata indicates the product priority rating being assigned to the product. Upon retrieving the metadata, a slot, from the plurality of slots, may be determined in the warehouse for placing the product. Once the slot has been determined, the system allocates the slot for placing the product. Thus, in this manner, the system allocates the slots to place the plurality of products thereby facilitating the optimization of space in the warehouse.

While aspects of described system and method for allocating slots to the plurality of products in order to facilitate optimization of space in the warehouse and may be implemented in any number of different computing systems, environments, and/or configurations, the embodiments are described in the context of the following exemplary system.

Referring now to FIG. 1, a network implementation 100 of a system 102 for allocating slots to a plurality of products in order to facilitate optimization of space in a warehouse is disclosed. In order to allocate the slots to the plurality of products, initially, the system 102 assigns a slot priority rating and a product priority rating. In one aspect, the slot priority rating may be assigned to each slot based on a user's accessibility to a plurality of slots. The product priority rating, on the other hand, may be assigned to each of the plurality of slots comprises an Internet of Things (IoT) device. Upon assigning the slot priority rating and the slot priority rating, the system 102 retrieves metadata from a tag associated to a product of the plurality of products. In one aspect, the metadata indicates the product priority rating being assigned to the product. Subsequent to the retrieval of the metadata, the system 102 determines a slot from the plurality of slots present in the warehouse for placing the product. In one aspect, the slot may be determined based on a predefined mapping of the product priority rating and the slot priority rating. After determining the slot, the system 102 allocates the slot, as determined, for placing the product thereby facilitating the optimization of space in the warehouse.

Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple users through one or more user devices 104-1, 104-2, 104-3, 104-N collectively referred to as user 104 or stakeholders, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
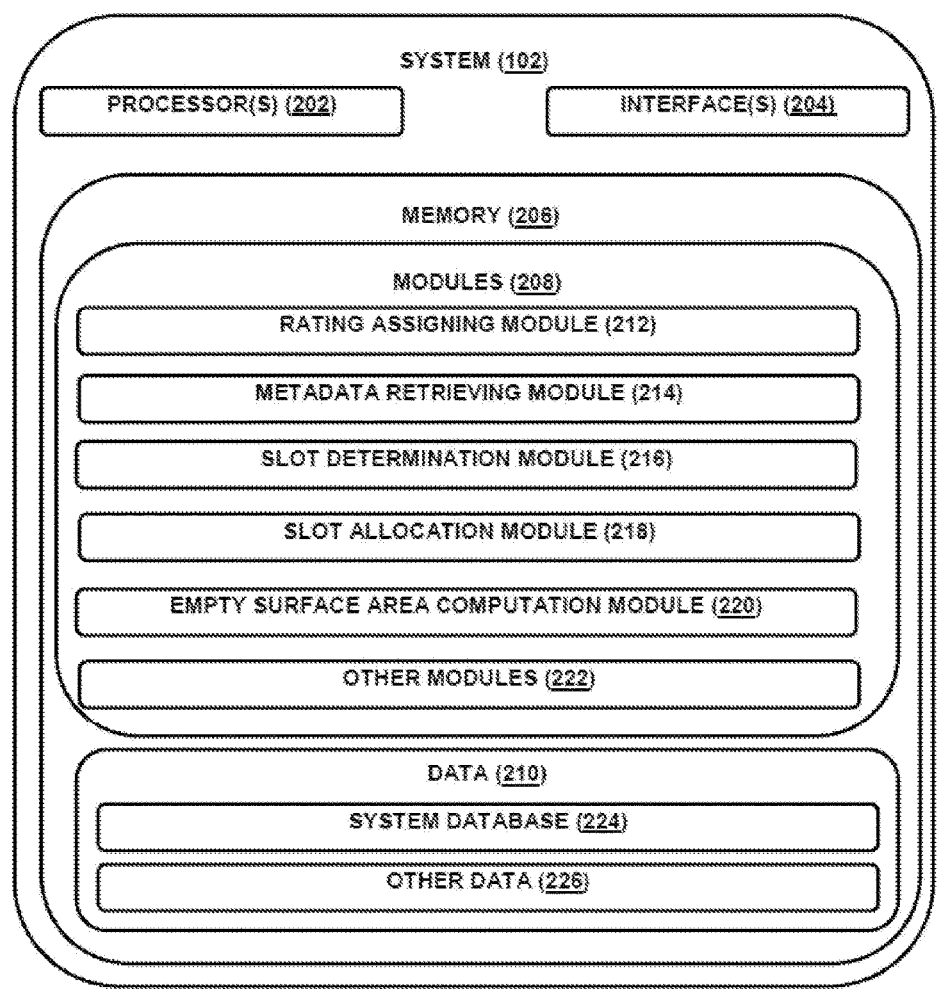
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a rating assigning module 212, a metadata retrieving module 214, a slot determination module 216, a slot allocation module 218, an empty surface area computation module 220, and other modules 222. The other modules 222 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 224 and other data 226. The other data 226 may include data generated as a result of the execution of one or more modules in the other modules 220.

As there are various challenges observed in the existing art, the challenges necessitate the need to build the system 102 for allocating slots to a plurality of products in order to facilitate optimization of space in a warehouse. In order to allocate the slots, at first, a user may use the client device 104 to access the system 102 via the I/O interface 204. The user may register them using the I/O interface 204 in order to use the system 102. In one aspect, the user may access the I/O interface 204 of the system 102. The system 102 may employ the rating assigning module 212, the metadata retrieving module 214, the slot determination module 216, the slot allocation module 218, and the empty surface area computation module 220. The detail functioning of the modules are described below with the help of figures.

It may be understood that some of the warehouses are still using manual slotting processes but with the number of products and volume are growing exponentially, it's getting difficult to achieve the efficiency of operations and hence the cost reduction. It is common that many of the leading Warehouse Management System (WMS) do not have in-built slotting mechanism to influence slotting in a warehouse. Therefore it is becoming utmost important to have an effective slotting methodology, in order to stand out in the competition and have a cost-effective operation in the warehouse.

In order to allocate slots to a plurality of products, initially, the rating assigning module 212 assigns a slot priority rating and a product priority rating. In one aspect, the slot priority rating may be assigned to each slot based on a user's accessibility to a plurality of slots. It may be understood that each of the plurality of slots comprises an Internet of Things (IoT) device. Examples of the IoT device may include, but not limited to, electronics, software, sensors, actuators, and network connectivity objects having capability to collect and exchange data. The product priority rating, on the other hand, may be assigned to each product of a plurality of products to be placed in the plurality of slots present in a warehouse. In one aspect, the product priority rating may be assigned based on demand of Fast Moving Consumer (FMC) products. It may be understood that with the help of IoT based sensors, the slotting may be done more effectively and automated so that manual handling may be avoided in the WMS. In one aspect, the slot priority rating and the product priority rating may also be assigned based on a large set of factors including, but not limited to, product family, weight, size, dimensions, and nature of the product.

Subsequent to the assignment of the slot priority rating and the product priority rating, the metadata retrieving module 214 retrieves metadata from a tag associated to a product of the plurality of products upon scanning the tag by using a scanning device. In one aspect, the tag is one of a Radio-Frequency Identification (RFID), a Unicode, or a Barcode. In one aspect, the metadata indicates the product priority rating being assigned to the product. Once the metadata is retrieved, the slot determination module 216 determines a slot, from the plurality of slots, in the warehouse for placing the product. In one aspect, the slot may be determined based on a predefined mapping of the product priority rating and the slot priority rating.

In one embodiment, when the slot as determined is already occupied with other products, the slot determination module 216 determines a substitute slot, from the plurality of slots, for accommodating the product. In one aspect, the substitute slot may be assigned with a slot priority rating subsequently higher than the slot priority rating assigned to the slot. After determining the slot, the slot allocation module 218 allocates the slot, as determined, for placing the product. Thus, in this manner, the system allocates the slots to place the plurality of products thereby facilitating the optimization of space in the warehouse.

Figure 3:
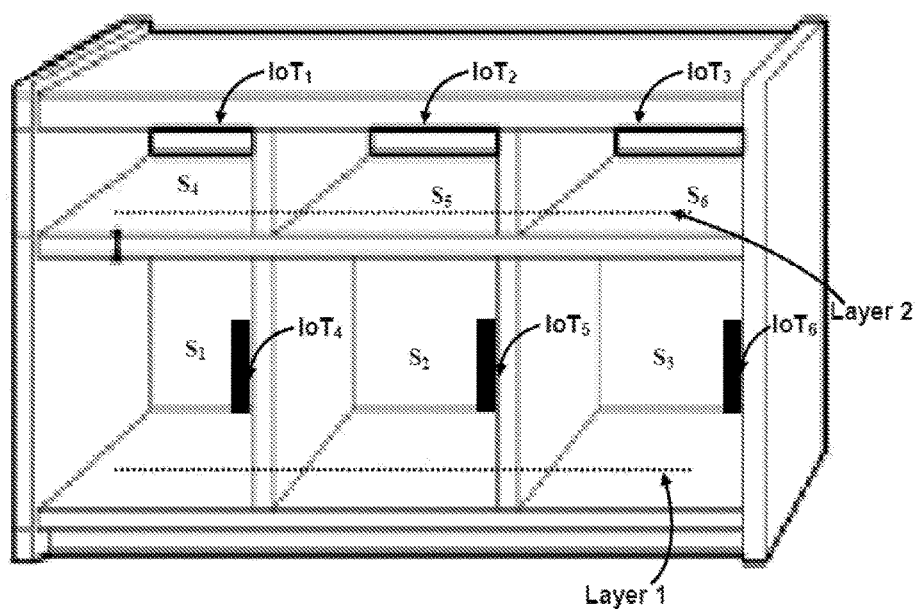
FIG. 3 illustrates an example, in accordance with an embodiment of the present subject matter.

In order to elucidate the methodology of the modules, as aforementioned, consider an example where slots for the '2' Fast Moving Consumer (FMC) products i.e. $X_1$ soap and $X_2$ soap have to be allocated in a Warehouse $W_1$. As illustrated in FIG. 3, it may be understood that the Warehouse $W_1$ has a rack containing two shelf having slots $S_1$, $S_2$, and $S_3$ in layer 1 and $S_4$, $S_5$, and $S_6$ in layer 2. Since layer is easily accessible than layer 2, the rating assigning module 212 assigns the slot priority rating to slots $S_1$, $S_2$, and $S_3$ in layer 1 with priority 1. On the other hand, the rating assigning module 212 assigns the slot priority rating to $S_4$, $S_5$, and $S_6$ in layer 2 with priority 2. It has been further observed from the demand that $X_1$ soap is more popular than $X_2$ soap in a specific jurisdiction. Since $X_1$ soap is having higher demand and faster moving product than $X_2$ soap, the rating assigning module assigns the product priority rating to $X_1$ soap with priority 1 and $X_2$ soap with priority 2.

After assigning the slot priority rating and the product priority rating, as and when the stock of $X_1$ soap and $X_2$ soap is received, which is to be kept in the Warehouse $W_1$, the metadata retrieving module 214 retrieves metadata from a tag associated to $X_1$ soap and $X_2$ soap upon scanning the tag by using a scanning device. Since the priority assigned to $X_1$ soap and $X_2$ soap are '1' and '2' respectively, the metadata retrieving module 214 retrieves metadata indicating the priority as '1' and '2' corresponding to $X_1$ soap and $X_2$ soap respectively. Subsequently, the slot determination module 216 determines the slots $S_1$, $S_2$, and $S_3$ for placing $X_1$ soaps and $S_4$, $S_5$, and $S_6$ for placing $X_2$ soaps. It may be understood that the slots $S_1$, $S_2$, and $S_3$ are determined for placing $X_1$ soaps because $X_1$ soaps have higher demand than $X_2$ soaps. Therefore, based on a predefined mapping of the product priority rating and the slot priority rating, the slots are accordingly assigned to the product. Similarly, the slots $S_4$, $S_5$, and $S_6$ are determined for placing $X_2$ soaps because $X_2$ soap has lesser demand than $X_1$ soap. Thus $X_1$ soaps are placed in the slots $S_1$, $S_2$, and $S_3$ which are easily accessible than the slots $S_4$, $S_5$, and $S_6$.

After determining the slots, the slot allocation module 218 allocates the slot $S_1$, $S_2$, and $S_3$ for placing $X_1$ soaps and $S_4$, $S_5$, and $S_6$ for placing $X_2$ soaps. In one embodiment, if the slot $S_1$, $S_2$, and $S_3$ are preoccupied and cannot occupy additional $X_1$ soaps, then in such a scenario the slot determination module 216 further determines a substitute slot, of the plurality of slots, for accommodating $X_1$ soaps. The slot allocation module 218 assigns the substitute slot amongst the slots in the layer 2 (i.e. $S_4$, $S_5$, and $S_6$), assigned with a slot priority rating '2', which is subsequently higher than the slot priority rating assigned to the slots in layer 1 (i.e. $S_1$, $S_2$, and $S_3$) i.e. '1'. Thus, when each of $S_1$, $S_2$, and $S_3$ are occupied, one of $S_4$, $S_5$, and $S_6$ may be substituted to accommodate additional $X_1$ soaps. Thus, in this manner, the system allocates the slots to place the plurality of products thereby facilitating the optimization of space in the warehouse.

In addition to the above, the empty surface area computation module 220 enables the IoT device, as illustrated in the FIG. 3, to compute an empty surface area of the slot based on product dimension data and slot dimension data associated with the slot. In one aspect, the product dimension data indicates an area occupied by zero or more products present in the slot. The slot dimension data, on the other hand, indicates a total area of the slot. It may be understood that the empty surface space may be computed by subtracting the product dimension data from the slot dimension data. Upon computing the empty surface area, the empty surface area computation module 220 enables the slot to accommodate additional products. By doing so, additional products may be accommodated in each slot for optimizing the space in the warehouse.

Figure 4:
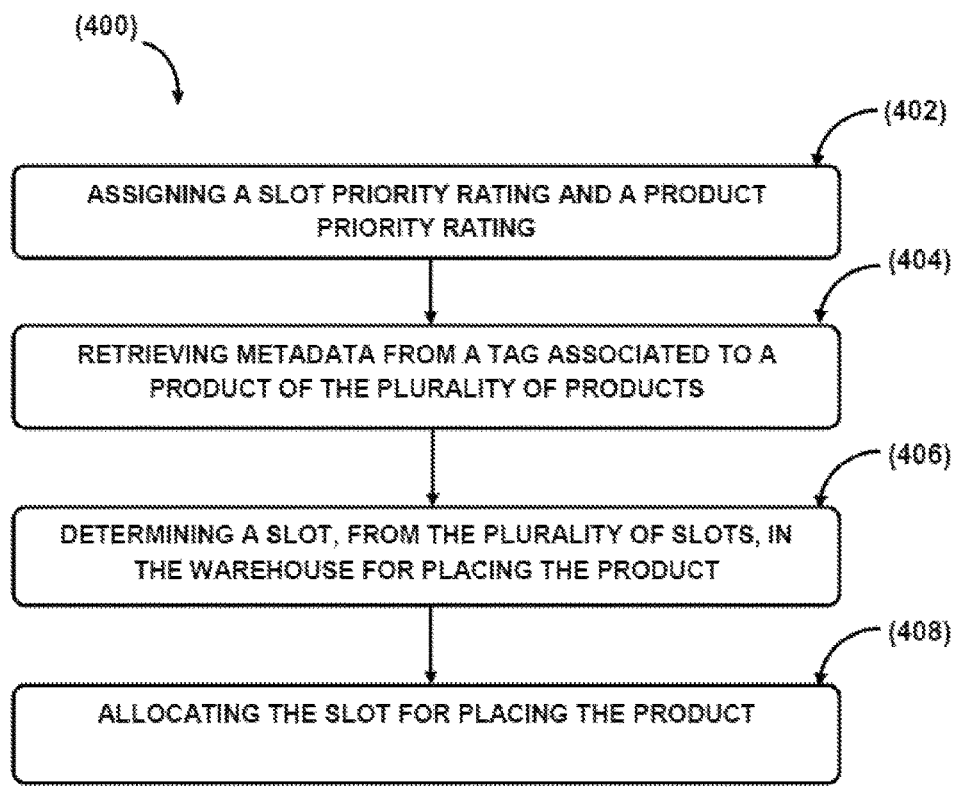
FIG. 4 illustrates a method for allocating the slots to the plurality of products in order to facilitate the optimization of space in the warehouse, in accordance with an embodiment of the present subject matter.

Referring now to FIG. 4, a method 400 for allocating slots to a plurality of products in order to facilitate optimization of space in a warehouse is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented as described in the system 102.

At block 402, a slot priority rating and a product priority rating may be assigned. In one embodiment, the slot priority rating may be assigned to each slot based on a user's accessibility to a plurality of slots. In one aspect, each of the plurality of slots comprises an Internet of Things (IoT) device. In another embodiment, the product priority rating may be assigned to each product of a plurality of products to be placed in the plurality of slots present in a warehouse. In one aspect, the product priority rating may be assigned based on demand of Fast Moving Consumer (FMC) products. In one implementation, the slot priority rating and the product priority rating may be assigned by the rating assigning module 212.

At block 404, metadata may be retrieved from a tag associated to a product of the plurality of products. In one aspect, the metadata indicates the product priority rating being assigned to the product. In one aspect, the metadata may be retrieved upon scanning the tag by using a scanning device. In one implementation, the metadata may be retrieved by the metadata retrieving module 214.

At block 406, a slot, from the plurality of slots, may be determined in the warehouse for placing the product. In one aspect, the slot may be determined based on a predefined mapping of the product priority rating and the slot priority rating. In one implementation, the slot may be determined by the slot determination module 216.

At block 408, the slot may be allocated for placing the product thereby facilitating the optimization of space in the warehouse. In one implementation, the slot may be allocated by the slot allocation module 218.

Exemplary embodiments discussed above may provide certain advantages. Though not required to practice aspects of the disclosure, these advantages may include those provided by the following features.

Some embodiments enable a system and a method for allocating slots to a plurality of products in order to facilitate optimization of space in a warehouse.

Some embodiments enable a system and a method for placing the plurality of products in the slots, present in the warehouse, for efficient picking and replenishment.

Some embodiments enable a system and a method to improve storage efficiency, increase picking efficiency, and reduction of handling cost.

Some embodiments enable a system and a method to allocate the slots to the plurality of products in a manner such that putting the fast moving items close to the shipping dock and on the lower pallet rack levels and storing slower moving items on higher levels and further away from the dock.

Although implementations for methods and systems for allocating slots to a plurality of products in order to facilitate optimization of space in a warehouse have been described in language specific to structural features and/or methods, it is to be understood that the appended claims are not necessarily limited to the specific features or methods described. Rather, the specific features and methods are disclosed as examples of implementations for allocating the slots to the plurality of products.

We claim:

1. A method for allocating slots to a plurality of products to facilitate optimization of space in a warehouse, the method comprising:
    assigning, by a processor,
        a slot priority rating to each slot based on a user's accessibility to a plurality of slots, wherein each of the plurality of slots comprises an Internet of Things (IoT) device, and
        a product priority rating to each product of a plurality of products to be placed in the plurality of slots present in a warehouse, wherein the product priority rating is assigned based on demand of Fast Moving Consumer (FMC) products;
    retrieving, by the processor, metadata from a tag associated to a product of the plurality of products, wherein the metadata indicates the product priority rating being assigned to the product, and wherein the metadata is retrieved upon scanning the tag by using a scanning device;
    determining, by the processor, a slot, from the plurality of slots, in the warehouse for placing the product, wherein the slot is determined based on a predefined mapping of the product priority rating and the slot priority rating; and
    allocating, by the processor, the slot, as determined, for placing the product thereby facilitating the optimization of space in the warehouse.

2. The method of claim 1, wherein the tag is one of a Radio-Frequency Identification (RFID), a Unicode, or a Barcode.

3. The method of claim 1 further comprising
    enabling, by the processor, the IoT device to compute an empty surface area of the slot based on product dimension data and slot dimension data associated with the slot, wherein the product dimension data indicates an area occupied by zero or more products present in the slot, and wherein the slot dimension data indicates a total area of the slot.

4. The method of claim 3, wherein the empty surface area, computed by the IoT device, is received by the processor for enabling the slot to accommodate additional products, wherein the empty surface space is computed by subtracting the product dimension data from the slot dimension data.

5. The method of claim 1 further comprising
    determining, by the processor, a substitute slot, of the plurality of slots, for accommodating the product when the slot is occupied, wherein the substitute slot is assigned with a slot priority rating subsequently higher than the slot priority rating assigned to the slot.

6. A system for allocating slots to a plurality of products in order to facilitate optimization of space in a warehouse, the system comprising:
    a processor; and
    a memory coupled to the processor, wherein the processor is capable of executing a plurality of modules stored in the memory, and wherein the plurality of modules comprising:
        a rating assigning module for assigning
            a slot priority rating to each slot based on a user's accessibility to a plurality of slots, wherein each of the plurality of slots comprises an Internet of Things (IoT) device, and
            a product priority rating to each product of a plurality of products to be placed in the plurality of slots present in a warehouse, wherein the product priority rating is assigned based on demand of Fast Moving Consumer (FMC) products;
a metadata retrieving module for retrieving metadata from a tag associated to a product of the plurality of products, wherein the metadata indicates the product priority rating being assigned to the product, and wherein the metadata is retrieved upon scanning the tag by using a scanning device;
a slot determination module for determining a slot, from the plurality of slots, in the warehouse for placing the product, wherein the slot is determined based on a predefined mapping of the product priority rating and the slot priority rating; and
a slot allocation module for allocating the slot, as determined, for placing the product thereby facilitating the optimization of space in the warehouse.

7. The system of claim 6, wherein the tag is one of a Radio-Frequency Identification (RFID), a Unicode, or a Barcode.

8. The system of claim 6 further comprising an empty surface area computation module for enabling the IoT device to compute an empty surface area of the slot based on product dimension data and slot dimension data associated with the slot, wherein the product dimension data indicates an area occupied by zero or more products present in the slot, and wherein the slot dimension data indicates a total area of the slot.

9. The system of claim 8, wherein the empty surface area, computed by the IoT device, is received by the empty surface area computation module for enabling the slot to accommodate additional products, wherein the empty surface space is computed by subtracting the product dimension data from the slot dimension data.

10. The system of claim 6, wherein the slot determination module further determines a substitute slot, of the plurality of slots, for accommodating the product when the slot is occupied, wherein the substitute slot is assigned with a slot priority rating subsequently higher than the slot priority rating assigned to the slot.

11. A non-transitory computer readable medium embodying a program executable in a computing device for allocating slots to a plurality of products in order to facilitate optimization of space in a warehouse, the program comprising a program code:
a program code for assigning
a slot priority rating to each slot based on a user's accessibility to a plurality of slots, wherein each of the plurality of slots comprises an Internet of Things (IoT) device, and
a product priority rating to each product of a plurality of products to be placed in the plurality of slots present in a warehouse, wherein the product priority rating is assigned based on demand of Fast Moving Consumer (FMC) products;
a program code for retrieving metadata from a tag associated to a product of the plurality of products, wherein the metadata indicates the product priority rating being assigned to the product, and wherein the metadata is retrieved upon scanning the tag by using a scanning device;
a program code for determining a slot, from the plurality of slots, in the warehouse for placing the product, wherein the slot is determined based on a predefined mapping of the product priority rating and the slot priority rating; and
a program code for allocating the slot, as determined, for placing the product thereby facilitating the optimization of space in the warehouse.

* * * * *